US008301282B2

(12) United States Patent
George et al.

(10) Patent No.: US 8,301,282 B2
(45) Date of Patent: Oct. 30, 2012

(54) FAST SYNTHESIS SUB-BAND FILTERING METHOD FOR DIGITAL SIGNAL DECODING

(75) Inventors: Sapna George, Singapore (SG); Haiyun Yang, Singapore (SG)

(73) Assignee: STMicroelectronics Asia Pacific Pte Ltd, Singapore (SG)

(*) Notice: Subject to any disclaimer, the term of this patent is extended or adjusted under 35 U.S.C. 154(b) by 311 days.

(21) Appl. No.: 12/501,342

(22) Filed: Jul. 10, 2009

(65) Prior Publication Data

US 2009/0276227 A1 Nov. 5, 2009

Related U.S. Application Data

(63) Continuation of application No. 09/486,582, filed as application No. PCT/SG97/00037 on Aug. 29, 1997, now abandoned.

(51) Int. Cl.
*G06F 17/00* (2006.01)

(52) U.S. Cl. ........................................ 700/94

(58) Field of Classification Search .................... 700/94
See application file for complete search history.

(56) References Cited

U.S. PATENT DOCUMENTS

| | | | |
|---|---|---|---|
| 4,896,362 | A | 1/1990 | Veldhuis et al. |
| 5,181,183 | A | 1/1993 | Miyazaki |
| 5,461,378 | A | 10/1995 | Shimoyoshi et al. |
| 5,479,562 | A | 12/1995 | Fielder et al. |
| 5,508,949 | A | 4/1996 | Konstantinides |
| 5,592,584 | A | 1/1997 | Ferreira et al. |
| 5,631,848 | A | 5/1997 | Laczko, Sr. et al. |
| 5,727,119 | A | 3/1998 | Davidson et al. |
| 5,805,484 | A | 9/1998 | Ikeda et al. |
| 5,864,800 | A | 1/1999 | Imai et al. |
| 5,991,787 | A | 11/1999 | Abel et al. |
| 6,304,847 | B1 | 10/2001 | Jhung |
| 6,587,590 | B1 | 7/2003 | Pan |

FOREIGN PATENT DOCUMENTS

| | | | |
|---|---|---|---|
| EP | 0506111 | A2 | 9/1992 |
| EP | 0564089 | A1 | 10/1993 |
| EP | 0590790 | A2 | 4/1994 |
| EP | 0718746 | A1 | 6/1996 |

OTHER PUBLICATIONS

"Information Technology—Coding of Moving Pictures and Associated Audio for Digital Storage Media at up to about 1,5 Mbit/s—Part 3: Audio," International Standard, ISO/IEC 11172-3, Aug. 1, 1993, 3 pages.

Proakis, J. et al., "Digital Signal Processing: Principles, Algorithms and Applications," 1996, pp. 290-292, 415, and 475-477, Prentice Hall, Upper Saddle River, New Jersey.

(Continued)

*Primary Examiner* — Andrew C Flanders
(74) *Attorney, Agent, or Firm* — Seed IP Law Group PLLC

(57) ABSTRACT

In order to reproduce audio signals which have been compressed or encoded for storage or transmission using, for example, MPEG audio encoding, a synthesis sub-band filter is employed which performs an inverse modified discrete cosine transform. The computational cost of the IMDCT implementation is reduced by pre-calculating arrays of sum and difference data. The arrays of sum and difference data are then used in two separate transform calculations, the results of which can be used in the generation of pulse code modulation audio data.

19 Claims, 4 Drawing Sheets

OTHER PUBLICATIONS

"Discrete Cosine Transform", retrieved from http://en.wikipedia.org/wiki/Discrete_cosine_transform, Nov. 27, 2007, 9 pages.
Office Action dated Feb. 24, 2005, relating to U.S. Appl. No. 09/486,582, 13 pages.
Amendment dated May 24, 2005, relating to U.S. Appl. No. 09/486,582, 10 pages.
Final Office Action dated Jun. 20, 2005, relating to U.S. Appl. No. 09/486,582, 14 pages.
Response under 37 C.F.R. 1.116 dated Aug. 22, 2005, relating to U.S. Appl. No. 09/486,582, 6 pages.
Advisory Action dated Sep. 2, 2005, relating to U.S. Appl. No. 09/486,582, 5 pages.
Appellants' Brief dated Jun. 20, 2006, relating to U.S. Appl. No. 09/486,582, 19 pages.
Office Action dated Aug. 11, 2006, relating to U.S. Appl. No. 09/486,582, 13 pages.
Amendment dated Nov. 13, 2006, relating to U.S. Appl. No. 09/486,582, 11 pages.
Final Office Action dated Feb. 8, 2007, relating to U.S. Appl. No. 09/486,582, 16 pages.
Response dated May 8, 2007, relating to U.S. Appl. No. 09/486,582, 8 pages.
Advisory Action dated May 24, 2007, relating to U.S. Appl. No. 09/486,582, 5 pages.
Appellants' Brief dated Sep. 6, 2007, relating to U.S. Appl. No. 09/486,582, 19 pages.
Examiner's Answer dated Dec. 6, 2007, relating to U.S. Appl. No. 09/486,582, 23 pages.
Appellants' Reply Brief dated Feb. 6, 2008, relating to U.S. Appl. No. 09/486,582, 4 pages.
Decision on Appeal dated May 11, 2009, relating to U.S. Appl. No. 09/486,582, 29 pages.

FAST SYNTHESIS SUB-BAND FILTERING METHOD FOR DIGITAL SIGNAL DECODING

CROSS-REFERENCE TO RELATED APPLICATION

This application is a continuation of and claims the benefit of U.S. patent application Ser. No. 09/486,582, filed Jul. 10, 2000, now pending, which application is incorporated herein by reference in its entirety, and which application is the National Phase of International Application No. PCT/SG97/00037, filed Aug. 29, 1997, incorporated herein by reference in its entirety.

BACKGROUND

1. Technical Field

This invention relates to digital signal decoding for the purposes primarily of audio reproduction. In particular, the invention relates to enhanced synthesis sub-band filtering during decoding of digital audio signals.

2. Description of the Related Art

In order to store or transmit data representing audio signals it is often desirable to first encode or compress the data so as to enable it to be stored or transmitted more efficiently. Decoding the data requires that the stored or transmitted data be reconstructed into audio signals by application of a decoding or decompression technique. The reconstruction process is typically quite computationally intensive, yet the process should be fast and reliable enough to enable the audio signals to be reconstructed in real time, on the fly, for example. In order for the decoding process to be carried out in relatively low-cost consumer products, the hardware utilised by the decoder should also preferably be relatively simple and inexpensive, or at least to the greatest extent reasonably possible.

Efficient stereo and multichannel digital audio signal coding methods have been developed for storage or transmission applications such as Digital Audio Broadcasting (DAB), Integrated Service Digital Network (ISDN), High Definition Television (HDTV) and Set Top Box (STB) for video-on-demand. The formats used to encode and reciprocally decode digital audio and video information for storage and retrieval is subject to various standards, one of which has been established by the Moving Pictures Experts Group and is known as the MPEG standard.

A standard on low bit rate coding for mono or stereo audio signals was established by MPEG-1 Audio, published under ISO-IEC/JTC1 SC29 11172-3, entitled "Coding of Moving Pictures and Associated Audio for Digital Storage Media at up to About 1.5 Mbits", and the disclosure of that document is incorporated herein by reference. MPEG-2 Audio (ISO/IEC 13818-3) provides the extension to 3/2 multichannel audio and an optional low frequency enhancement channel (LFE). The audio part of the standard, ISO/IEC 11172-3, defines three algorithms, Layer 1, 2 and 3 for coding PCM audio signals. MPEG-2 (Multichannel) also defines Layer 1, 2, and 3 algorithms.

The MPEG audio encoder processes a digital audio signal and produces a compressed bitstream for transmission or storage. The encoder algorithm is not standardised, and may use various means for encoding such as estimation of the auditory masking threshold, quantisation, and scaling. However, the encoder output must be such that a decoder conforming to the above-mentioned standards specification will produce audio suitable for the intended application.

The decoder, subject to the application-dependent parameters, accepts the compressed audio bitstream in the defined syntax, decodes the data elements and uses the information to produce digital audio output, also according to the defined standard. The decoder first unpacks the received bitstream to recover the encoded audio information frame by frame.

After the process of frame unpacking, the decoder performs an inverse quantisation (expansion process) and feeds a sub-band synthesis filter bank with a set of 32 scaled-up sub-band samples in order to reconstruct the output PCM audio signals. The sub-band filter banks used for Layer 1 and Layer 2 of MPEG 1 audio decoder and Layer 1 and Layer 2 of MPEG2 (Multichannel extension) audio decoder, are the same.

The sub-band synthesis filter is one of the most computationally intensive blocks of the MPEG audio decoder. Sub-band filtering is performed for each sub-band in a frame and for every channel. Any reduction in its computational requirements thus enables less complexity and reduced cost of decoding.

BRIEF SUMMARY

In accordance with the present invention there is provided a method of decoding digital audio data, comprising the steps of obtaining an input sequence of data elements representing encoded audio samples, calculating an array of sum data and an array of difference data using selected data elements from the input sequence, calculating a first sequence of output values using the array of sum data, calculating a second sequence of output values using the array of difference data and forming decoded audio signals from the first and second sequences of output data.

Preferably, the array of sum data is obtained by adding together respective first and second data elements from the input sequence, the first and second data elements being selected from mutually exclusive sub-sequences of the input sequence. Furthermore, the array of difference data is preferably obtained by subtracting respective first data elements from corresponding second data elements of the input sequence, the first and second data elements being selected from mutually exclusive sub-sequences of the input sequence.

In one form of the invention the step of calculating an array of sum data and an array of difference data comprises dividing the input data sequence into first and second equal sized sub-sequences, the first sub-sequence comprising the high order data elements of the input sequence and the second sub-sequence comprising the low order data elements of the input sequence, calculating the array of sum data by adding together each respective data element of the first sub-sequence with a respective corresponding data element of the second sub-sequence, and calculating the array of difference data by subtracting each respective data element of the first subsequence from a respective corresponding data element of the second sub-sequence.

The invention also provides method of decoding a sequence of m, m an even positive integer, input digital audio data samples S[k], where k=0, 1, . . . (m−1), to produce a set of n, an even positive integer, output audio data samples V[i]. where i=0, 1, . . . (n−1), comprising the steps of:

a) calculating an array of sum data $S_{ADD}[k]$ according to $$S_{ADD}[k]=S[k]+S[m-1-k] \text{ for } k=0, 1, \ldots (m/2-1)$$

b) calculating an array of difference data $S_{SUB}[k]$ according to $$S_{SUB}[k]=S[k]-S[m-1-k] \text{ for } k=0.1 \ldots (m/2-1)$$

c) calculating a first output audio data sample by a multiply-accumulate operation according to $$V[2i] = V[2i] + N[2i \cdot k] * S_{ADD}[k]$$

$$\text{for } k = 0, 1, \ldots (m/2\text{-}1)$$

$$\text{where } N[2i, k] = \cos\left[\frac{(32 + 2i)(2k + 1)\pi}{64}\right]$$

d) calculating a second output audio data sample by a multiply-accumulate operation according to $$V[2i + 1] = V[2i + 1] + N[2i + 1, k] * S_{SUB}[k]$$

$$\text{for } k = 0, 1, \ldots (m/2\text{-}1)$$

$$\text{where } N[2i + 1, k] = \cos\left[\frac{(32 + (2i + 1))(2k + 1)\pi}{64}\right]$$

e) and repeating steps c) and d) for i=0, 1, . . . (n/2−1) to obtain a full set of output data.

The invention further provides a synthesis subband filter for use in decoding digital audio data, comprising a means for receiving or retrieving an input sequence of data elements comprising encoded digital audio data, a pre-calculation means for calculating an array of sum data and an array of difference data using selected data elements from the input sequence, and a transform calculation means for calculating a first sequence of decoded output values using said array of sum data and a second sequence of decoded output values using said array of difference data

BRIEF DESCRIPTION OF THE SEVERAL VIEWS OF THE DRAWINGS

The invention is described in greater detail hereinbelow, by way of example only, with reference to the accompanying drawings, in which.

DETAILED DESCRIPTION

Figure 1:
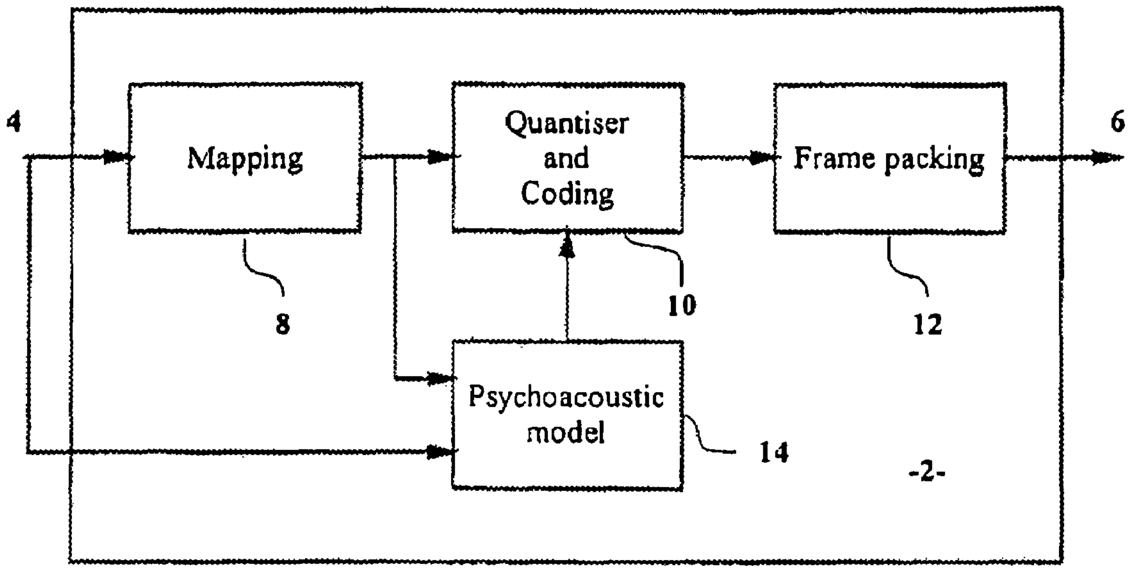
FIG. 1 is a block diagram of major functional portions of an MPEG audio encoder.

FIG. 1 is a block diagram illustrating the major components of an MPEG audio encoder circuit 2 constructed in accordance with the aforementioned standards document. In the figure, an input signal 4, comprising a pulse code modulated (PCM) signal having a 48 kHz sampling frequency and a sample size of 16 bits per sample, is provided as input to the single channel encoder 2. The input signal is first mapped from the time domain into the frequency domain by a sub-band filter bank 8. The resulting coefficients are normalized with scale factors which may be transmitted as side information. The coefficients thus obtained are then quantized and entropy encoded by a quantizer and encoding circuit 10. Masking thresholds of the quantization errors are calculated based on psychoacoustic values provided by a psychoacoustic model 14 to control the quantization step. The bit allocation is transmitted as side information. The coded signal is then multiplexed by a frame packing circuit 12 and an encoded bitstream 6 is produced at the output of the encoder 2.

Figure 2:
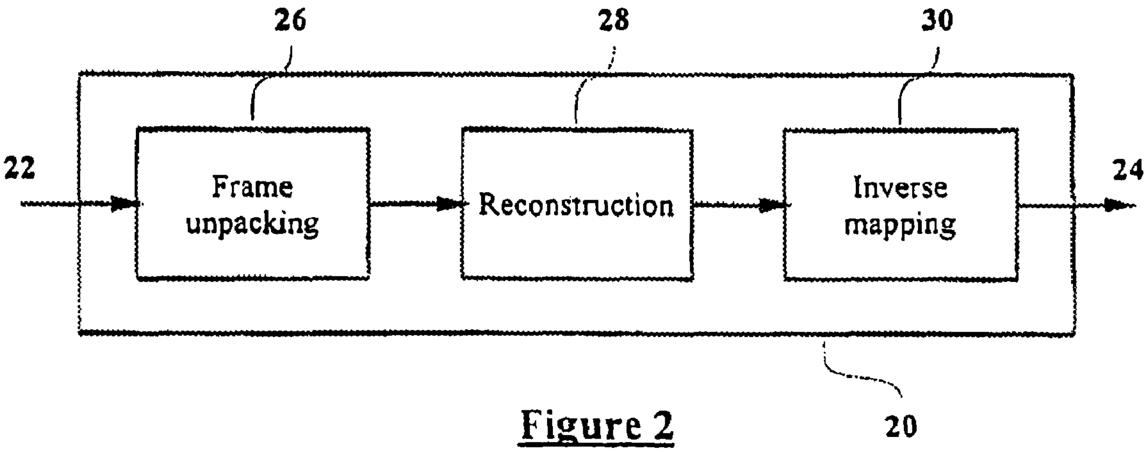
FIG. 2 is a block diagram of mayor functional portions of an MPEG audio decoder.

A block diagram illustrating the main components of an MPEG audio decoder circuit 20 is shown in FIG. 2. In the figure, an encoded bitstream 22 is provided to the input of the decoder. A bitstream unpacking and decoding circuit 26 performs an error correction operation if such operation was applied in the encoder. The bitstream data are unpacked to recover the various pieces of encoded information, and a reconstruction circuit 28 reconstructs the quantized version of the set of mapped samples from the frames of input data.

An inverse mapping circuit 30 transforms the mapped samples back into a uniform pulse code modulated (PCM) output signal 24 that reproduces the corresponding input signal which was provided to the encoder.

The foregoing descriptions of the encoder and decoder are specific to the MPEG standard, and it is considered to be within the skill of those in the art to implement the various hardware functions described above. Accordingly, a more detailed hardware description of an MPEG coding system is not considered necessary for a full and complete understanding of the invention. It should be appreciated the invention described herein, although described in connection with the MPEG coding standard, is considered useful for other coding applications and standards.

Figure 3:
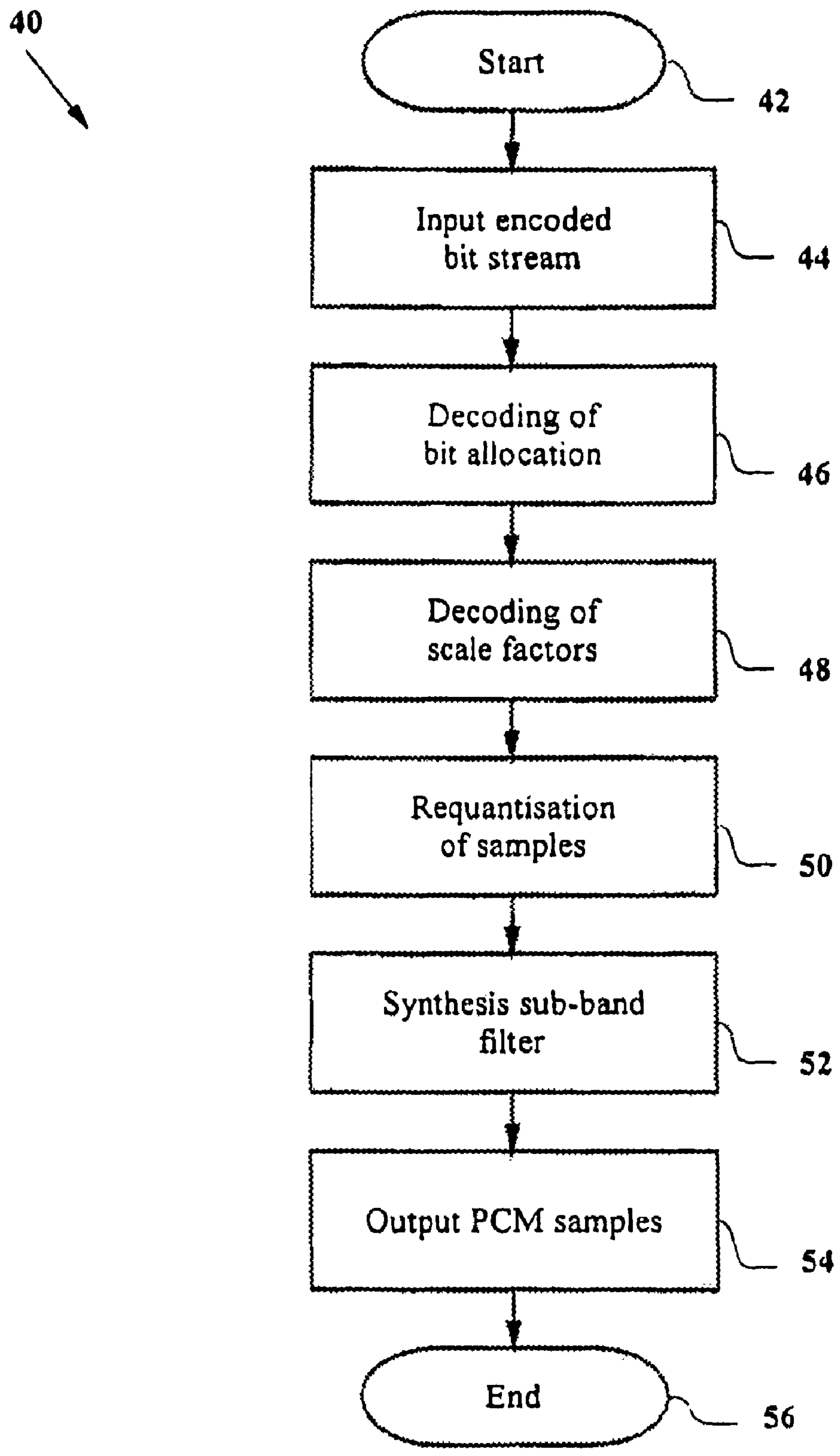
FIG. 3 is a flow diagram of an MPEG decoding procedure.

Referring to FIG. 3, there is shown a flow diagram 40 of steps involved in signal processing in layers I and II in an MPEG1 audio decoder. To begin with, the bit allocation of an input bitstream (42, 44) is decoded (46). Thereafter, various scale factors are also decoded (48) and the samples are requantized (50). The encoded signal is decoded in a synthesis sub-band filter (52) and the decoded pulse code modulated signals are output (54, 56) for further processing and/or real time reproduction. The present invention relates primarily to the synthesis sub-band filter portion of the decoding process, when implemented for MPEG decoding.

The synthesis sub-band filter bank is composed of two main functions, an Inverse Modified Discrete Cosine Transform (IMDCT) and an Inverse Pseudo-Quadrature Mirror Filter (IPQMF). The IMDCT, which can be viewed as an overlap transform, performs a 32×64 cosine modulation transformation, which means a frequency shift of a filter bank into one single filter.

Consider a system in which output sub-band audio signal samples $V_i$ (i=0 . . . 63) are decoded from sequences of 32 encoded input samples $S_k$, k=0 . . . 31. The inverse MDCT of the sequence $S_k$, is defined as follows:

$$V_i = \sum_{k=0}^{31} \cos\left[\frac{(16 + i)(2k + 1)\pi}{64}\right] * S_k \quad (1)$$

$$\text{for } i = 0, 1, \ldots 63$$

Taking the cosine symmetric property wherein:

$$\cos 0 = \cos(2\pi - 0) \quad (2)$$

the IMDCT definition equation (1) may be modified as given below to implement a 32-point IMDCT. The remaining 32 output audio signal samples are obtained after post-processing from this IMDCT of S.

$$V_i = \sum_{k=0}^{31} \cos\left[\frac{(16+i)(2k+1)\pi}{64}\right] * [S_k + (-1)^i * S_{31-k}] \quad (1)$$

for $i = 0, 1, \ldots 31$

This equation (3) may be computed according to the following algorithm:

```
repeat i = 32 times
        repeat k = 16 times
            if I is even, Sum = S[k] + S[31 − k]
            if l is odd, Sum = S[k] − S[31 − k]
            V[i] = V[i] + N[i, k] * Sum
        end k
end i
where   i       is the index of output samples (i = O . . . 31)
        k       is the index of input samples (k = O . . . 15)
```

$$N(i, k) = \cos\left[\frac{(32+2i)(2k+1)\pi}{64}\right]$$

| | |
|---|---|
| S[k] | represents the input sample data sequence |
| V[i] | represents the output of IMDCT |

The IMDCT equation, making use of the symmetrical property, is given in Equation (3) above, and the computational effort required for MPEG audio decoding is in large part dependant upon the efficiency with which the input samples can be processed through the IMDCT to obtain respective sub-band filter PCM samples. Embodiments of the present invention are able to reduce the number of arithmetic operations performed in implementing the IMDCT portion of the decoder, to thereby increase the computational efficiency of the decoding process. In particular, the number of addition operations required for the implementation of this equation can be reduced substantially by pre-computing the sum and difference of the sample data which is the input to the IMDCT. In addition, the pre-computation can take place outside the main IMDCT computational loop. Hence the main loop contains only the MAC operations, which can be executed very efficiently by any general purpose DSP in a minimum number of cycles.

In the present invention the dequantised sample data (e.g., 32 samples) from the encoded bitstream is pre-processed as per the symmetrical property of the cosine coefficients. The sample data is then split into two banks, each containing 16 samples. The sum and difference of respective data elements in the two banks is computed and stored in two arrays. These arrays are used as the input data for the subsequent MAC operations.

Prior art implementations of equation (3) have required 32×16 Multiply-Accumulate operations and 32×16 Addition operations. By using the pre-computation operations described above, however, the number of Addition operations reduces to 2×16. This results in a saving of 30×16 Addition operations per Sub-band filter implementation, which in turn translates to a corresponding reduction in overall computational power.

In the IMDCT equation (3), $S_k$ represents a sequence of m input data samples, where k=0 . . . (m−1). In a typical implementation for MPEG decoding 32 input data samples may be processed, such that m=32. For pre-computing the sum and difference of respective data elements, the input data sample sequence is first arranged into two equally sized data banks, one constituting the high order data elements and the other the low order data elements:

Data bank(1)$S_k$ for $k=0 \ldots (m/2)-1$

Data bank(2)$S_k$ for $k=(m/2) \ldots (m-1)$

For example, in a preferred embodiment of the present invention where m=32, $S_k$ is split into two data banks comprising:

$$S_k \text{ for } k=0 \ldots 15 \quad (1)$$

$$S_k \text{ for } k=16 \ldots 31 \quad (2)$$

The sum and difference data are calculated using respective data elements from the two data banks and is stored in two arrays of data, $S_{ADD}$ and $S_{SUB}$ which are computed as follows:

$$S_{ADD}[k]=S[k]+S[m-1-k] \text{ for } k=0, 1\ (m/2)-1 \quad (4)$$

$$S_{SUB}[k]=S[k]-S[m-1-k] \text{ for } k=0, 1\ (n/2)-1 \quad (5)$$

In the aforementioned example of 32 input data samples, equations (4) and (5) reduce to:

$$S_{ADD}[k]=S[k]+S[31-k] \text{ for } k=0, 1, \ldots 15$$

$$S_{SUB}[k]=S[k]-S[31-k] \text{ for } k=0, 1, \ldots 15$$

The IMDCT equation (3) may now be divided into two portions and rewritten as follows:

$$V[i] = \sum_{k=0}^{15} \cos\frac{(32+i)(2k+1)\pi}{64} * S_{ADD}[k] \quad (6)$$

for $i = 0, 2, 4, \ldots 30$ $$V[i] = \sum_{k=0}^{15} \cos\frac{(32+i)(2k+1)\pi}{64} * S_{ADD}[k] \quad (7)$$

for $i = 0, 1, 3, 5, \ldots 31$

As shown in the above equations (6) and (7), the IMDCT may now be calculated in two passes, an 'even pass' where the sum of the sample data is used (equation (6)), and an 'odd pass' where the difference of the sample data is used (equation (7)). The computational algorithms of the above equations are shown below.

Calculation of sum and difference of sample data (Addition operations)

```
repeat k = 16 times
    S_ADD[k] = S_k + S_31-k
    S_SUB[k] = S_k − S_31-k
end k
```

Calculation of 'even' data of IMDCT (Multiply-Accumulate operations)

```
repeat i = 16 times
    repeat k = 16 times
        V[i] = V[i] + N[i,k]*S_ADD[k]
    end k
end i
```

Calculation of 'odd' data of IMDCT (Multiply-Accumulate operations)

```
repeat i = 16 times
        repeat k = 16 times
            V[i] = V[i] + N[I, k]*S_SUB[k]
        end k
end     i
where   i         is the index of output samples (i = 0 . . . 31)
        k         is the index of input samples (k = 0 . . . 15)
```

$$N(i,k) = \cos\left[\frac{(32+2i)(2k+1)\pi}{64}\right]$$

Figure 4:
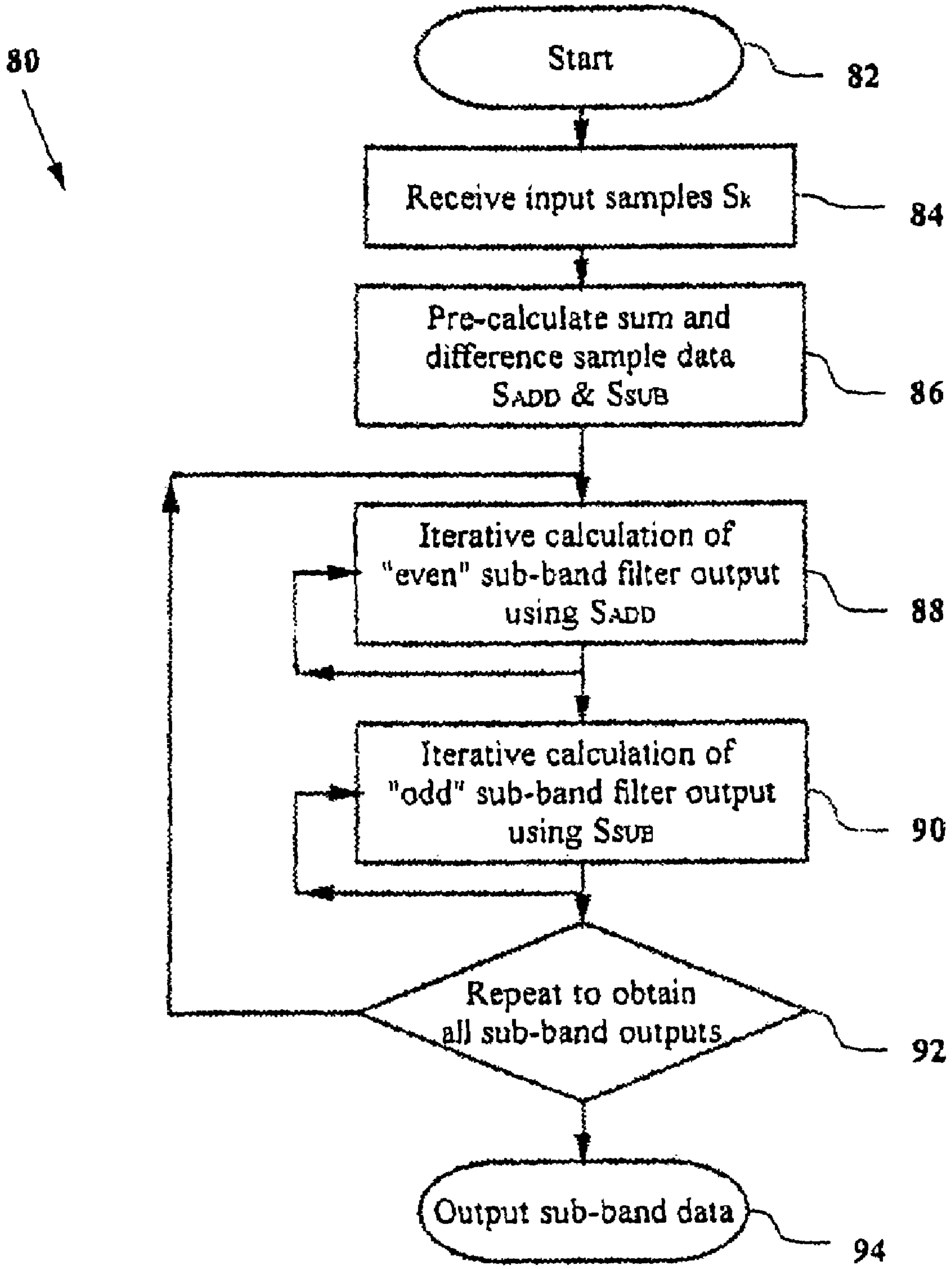
FIG. 4 is a flow diagram showing a generalised form of a procedure according to the present invention.
Figure 5:
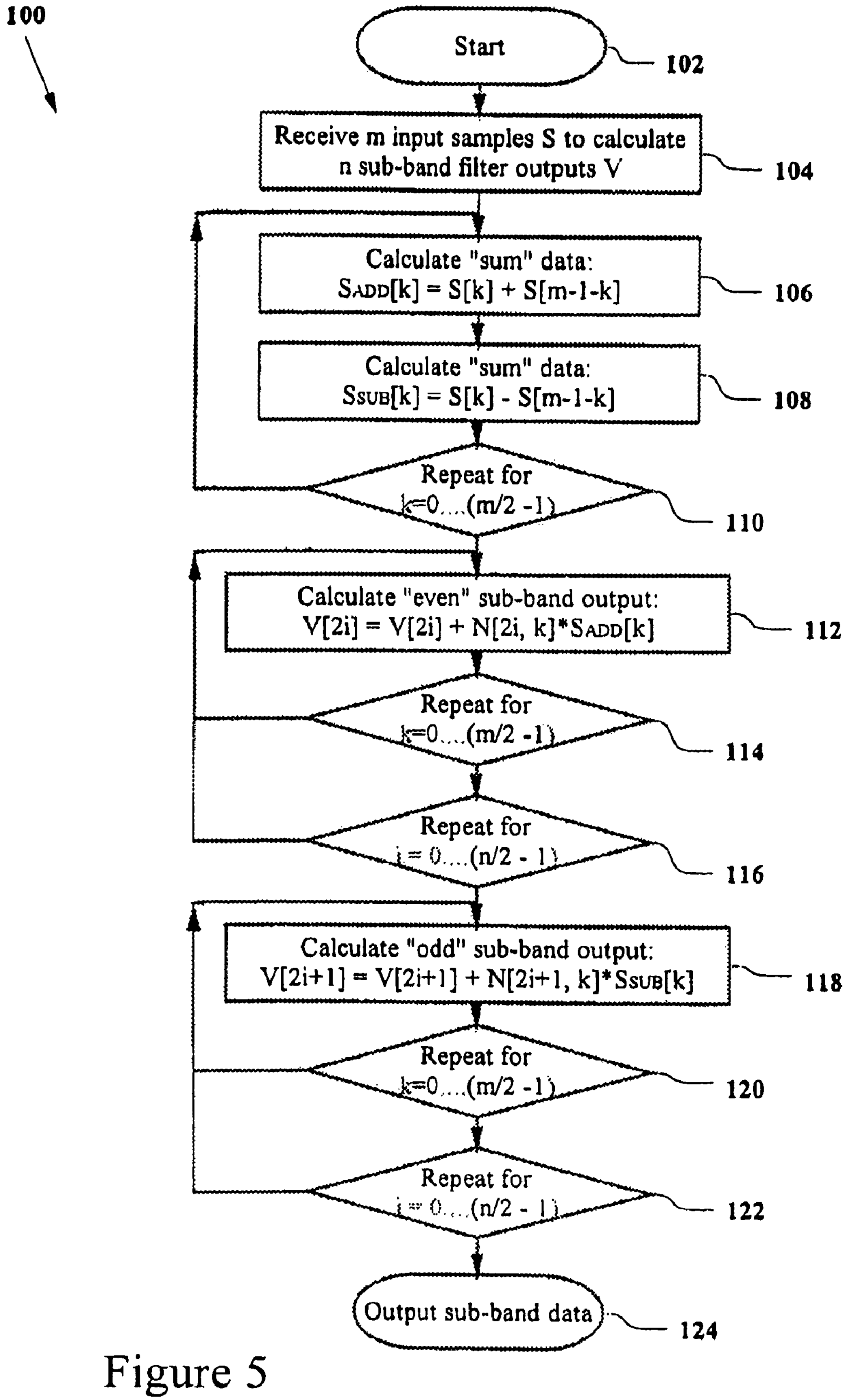
FIG. 5 is a flow diagram illustrating a preferred implementation of the invention.

S[k] represents the input sample data sequence
$S_{ADD}$ represents the sum of data array
$S_{SUB}$ represents the difference of data array
V[i] represents the output of the IMDCT FIGS. 4 and 5 illustrate the above procedure according to a preferred embodiment of the invention in the form of flow diagrams. The representation shown in FIG. 4, illustrates the general steps involved, and the procedure illustrated in the flow diagram 80 of FIG. 4 corresponds to the synthesis sub-band filter step 52 of the overall decoding procedure 40 of FIG. 3. To begin with the input samples $S_k$ are received (82, 84) after having been isolated from the frames of encoded data received or retrieved. The input data samples are then utilised for pre-calculation of sum and difference data, as described above. This involves dividing the input data sample set into two equal sized sub-sets, which in the preferred embodiment consists of a first sub-set comprising the lower order data and a second sub-set comprising the higher order data. For example, in the case of 32 input samples $S_0$ to $S_{31}$ as described the first sub-set of input sample data may comprise the lower order input data $S_0$ to $S_{15}$ and the second sub-set comprises the upper order data samples $S_{16}$ to $S_{31}$. Respective ones of each sub-set of input sample data are then used to obtain a sets of sum and difference data, $S_{ADD}$ and $S_{SUB}$. As can be readily ascertained from the above description, in the preferred embodiment the calculation of the sum and difference data is performed using the lowest order samples from the first set with the corresponding highest samples from the second set. For example, in the case of 32 input samples, the sum and difference data elements may be calculated as follows:

$$S_{ADD}[0] = S[0] + S[31] \qquad S_{SUB}[0] = S[0] - S[31]$$
$$S_{ADD}[1] = S[1] + S[30] \qquad S_{SUB}[1] = S[1] - S[30]$$
$$S_{ADD}[2] = S[2] + S[29] \qquad S_{SUB}[2] = S[2] - S[29]$$
$$\ldots \qquad \ldots$$
$$\ldots \qquad \ldots$$
$$S_{ADD}[15] = S[15] + S[16] \qquad S_{SUB}[15] = S[15] - S[16]$$

Once the arrays of sum and difference data have been calculated, the multiply-accumulate operations required to calculate the IMDCT can be performed iteratively in two steps. The first step (88) is used to obtain half of the output samples (e.g., the "even" outputs) using the pre-calculated sum data comprising the $S_{ADD}$ data elements. The second step (90) is used to obtain the other half of the output samples (e.g., the "odd" outputs) using the pre-calculated difference data comprising the $S_{SUB}$ data elements. Each of these steps (88, 90) is an iterative multiply-accumulate (MAC) operation involving each of the data elements from the respective $S_{ADD}$ or $S_{SUB}$ array. Furthermore, each of the MAC operations of steps 88, 90 are performed repeatedly (step 92) to obtain a full complement of output samples. For example, where 32 output samples $V_0$ to $V_{31}$ are required, each of the iterative MAC steps 88, 90 would be performed 16 times. Once the data for each output has been calculated, the data samples are output for PCM processing (step 94).

A more detailed preferred embodiment of the decoding procedure is illustrated in the flow diagram 100 shown in FIG. 5. Beginning at step 102, a sequence of m input samples $S_k$ (k=0 . . . m−1) are received for decoding to n sub-band filter outputs $V_i$ (i=0 . . . n−1) at step 104. In the preferred embodiment for an MPEG implementation, both the number of input samples m and the number of output samples n are the same, 32. Steps 106, 108 and 110 of procedure 100 form a loop for the pre-calculation process of determining and storing the sum and difference data arrays from the input data samples. The steps 112, 114, and 116 then form nested loops for the iterative multiple-accumulate calculation of the "even" ones of the output data elements (e.g., $V_i$ for i=0, 2, 4, . . . 30), using the pre-calculated sum data array $S_{ADD}$. A calculation loop of steps 112 and 114 provides the iterative MAC operation, whilst the loop provided by step 116, enables calculation of each (even) alternate output data element. The remaining (odd) alternate output data elements are calculated in nested loop steps 118, 120, 122 using the difference data array $S_{SUB}$. The resulting output sub-band data is then provided at final step 124.

The preferred form of the invention presented herein results in a reduction of 480 addition operations per 32 sub-band samples. For a stereo output MPEG1 Layer 2 audio decoder, this is a reduction of 480*36*2 arithmetic operations per frame. The overall reduction in arithmetic operations which is achieved is approximately 46.875% per IMDCT.

It will be readily apparent to those of ordinary skill in the relevant art that the present invention may be implemented in numerous different ways, without departing from the spirit and scope of the invention as described herein, and it is to be understood that such modifications are considered to be within the scope of the invention. In any event, it is immediately recognisable that one way the invention can be carried out, relating as it does to the processing of data, is using general purpose computing apparatus operating under the instruction of software or the like which is produced separately and specially adapted to perform the methods of the invention. Alternatively, specialised computing apparatus such as a dedicated integrated circuit, chipset or the like may be constructed with the functions of the invention embedded therein. Many other variations to the particular implementation will of course be possible. It will also be recognised that in places in the description and appended claims where it is said that a data set is divided into sub-sets, for example, this division may be simply a notional one, and no physical separation need occur, as is known in the data processing art.

The foregoing detailed description of the present invention has been presented by way of example only, and is not intended to be considered limiting to the invention which is defined in the claims appended hereto.

The invention claimed is:

1. A method of decoding electronically stored digital audio data, comprising:

retrieving with a first electronic circuit an input sequence of data elements representing encoded audio samples;

pre-processing the input sequence of data elements with a second electronic circuit to produce an array of sum data and an array of difference data using selected data elements from the input sequence;

producing with the second electronic circuit a first sequence of output values using the array of sum data;

producing with the second electronic circuit a second sequence of output values using the array of difference data; and forming with the second electronic circuit a sequence of decoded audio signals from the first and second sequences of output values by producing interim sequences of decoded signals from the first and second sequences of output values and overlapping and adding successive ones of the interim sequences of decoded signals to form the sequence of decoded audio signals, the sequence of decoded audio signals having a different number of elements than the input sequence of data elements.

2. The method of claim 1 wherein the forming with the second electronic circuit includes executing an inverse modified discrete cosine transform with an inverse mapping circuit.

3. The method as claimed in claim 1 wherein the array of sum data is obtained by adding together respective first and second data elements from the input sequence, the first and second data elements being selected from mutually exclusive sub-sequences of the input sequence and the array of difference data is obtained by subtracting respective the first data elements from the corresponding second data elements of the input sequence.

4. The method as claimed in claim 1 wherein the step of preprocessing the input sequence of data elements with a second electronic circuit to produce an array of sum data and an array of difference data includes:

dividing the input data sequence into first and second equal sized sub-sequences, the first sub-sequence including the high order data elements of the input sequence and the second sub-sequence including the low order data elements of the input sequence;

producing the array of sum data by adding together each respective data element of the first sub-sequence with a respective corresponding data element of the second sub-sequence; and producing the array of difference data by subtracting each respective data element of the first sub-sequence from a respective corresponding data element of the second sub-sequence.

5. The method as claimed in claim 1 wherein producing with the second electronic circuit a first sequence of output values includes performing a multiply-accumulate operation utilizing each of the sum data elements and producing with the second electronic circuit a second sequence of output values includes performing a multiply-accumulate operation utilizing each of the difference data elements.

6. The method as claimed in claim 1 wherein the input sequence of data elements is derived from MPEG encoded audio data, and wherein the decoded audio signals are pulse code modulation (PCM) samples.

7. A method to reduce power during decode of digital audio data, comprising unpacking a stored sequence of N samples of digital audio data;

storing a sum array of N/2 samples of digital audio data, forming the sum array by a plurality of addition operations of different first and second samples from the sequence of N samples of digital audio data such that each entry of the sequence of N samples of digital audio data has been used once;

storing a difference array of N/2 samples of digital audio data, forming the difference array by a plurality of subtraction operations of different first and second samples corresponding to the different first and second samples used to form the sum array;

transformationally calculating a first sequence of decoded values using the sum array of N/2 samples of digital audio data;

transformationally calculating a second sequence of decoded values using the difference array of N/2 samples of digital audio data; and storing a third sequence of output values, the third sequence formed by alternately drawing successive samples from the first sequence of decoded values and the second sequence of decoded values and overlapping and adding the successive ones of the samples, wherein the number of output values in the third sequence is not N.

8. The method to reduce power of claim 7 wherein unpacking the stored sequence of N samples of digital audio data includes recovering frames of encoded audio information.

9. The method to reduce power of claim 7 wherein unpacking the electronically stored sequence of N samples of digital audio data includes expanding the digital audio data in an inverse quantization process.

10. The method to reduce power of claim 7 wherein forming the sum array includes:

choosing as the first sample, an sample from the stored sequence of N samples of digital audio data having a lowest array index; and choosing as the second sample, an sample from the stored sequence of N samples of digital audio data having a highest array index, wherein each sample is chosen only once.

11. The method to reduce power of claim 7 wherein transformationally calculating the first sequence of decoded values includes executing an inverse modified discrete cosine transform.

12. The method to reduce power of claim 7 wherein transformationally calculating the first sequence of decoded values and transformationally calculating the second sequence of decoded values includes executing a multiply-accumulate operation.

13. The method to reduce power of claim 7 wherein transformationally calculating the first sequence of decoded values includes executing an inverse modified discrete cosine transform across the range of i=0, 1, . . . (N/2−1) according to:

$$V[2i] = V[2i] + \cos\left[\frac{(32+2i)(2k+1)\pi}{64}\right] * S_{ADD}[k]$$

for k=0, 1, . . . (N/2−1); and transformationally calculating the second sequence of decoded values includes executing an inverse modified discrete cosine transform across the range of i=0, 1, . . . (N/2−1) according to:

$$V[2i+1] = V[2i+1] + \cos\left[\frac{(32+(2i+1))(2k+1)\pi}{64}\right] * S_{SUB}[k]$$

for k=0, 1, . . . (N/2−1);

wherein the sum array is represented as $S_{ADD}[k]$, the difference array is represented as $S_{SUB}[k]$, and the sequence of output values is represented as V[i].

14. The method to reduce power of claim 7 further comprising:

outputting the electronically stored sequence of N output values as PCM data.

15. A non-transitory computer readable storage device programmed to direct a decoder to decode digital audio data, the decoder operable in accordance with the method of claim 7.

16. A non-transitory computer readable media storing instructions that are executable by an audio decoder circuit to cause an electronic chipset to:

obtain an input sequence of N encoded audio samples;

divide the input sequence into two equal segments;

preprocess the input sequence of N encoded audio samples to produce an array of sum data and an array of difference data using selected data elements from the two segments;

produce a first sequence of output values using the array of sum data;

produce a second sequence of output values using the array of difference data; and form a sequence of M decoded audio signals by interleaving the first and second sequences of output values and overlapping and adding successive ones of the interleaved sequences of output values, wherein M is not equal to N.

17. The non-transitory computer readable media of claim 16 wherein one of said segments includes the high order elements of the input sequence, and the other of said segments includes the low order elements of the input sequence.

18. A low power digital audio decoder, comprising:

a bitstream unpacking and decoding circuit configured to retrieve and unpack a sequence of N samples of digital audio data;

a reconstruction circuit configured to store a sum array of N/2 samples of digital audio data, the sum array formed by a plurality of addition operations of different first and second samples from the sequence of N samples of digital audio data such that each entry of the sequence of N samples of digital audio data has been used once, the reconstruction circuit further configured to store a difference array of N/2 samples of digital audio data, the difference array formed by a plurality of subtraction operations of different first and second samples corresponding to the different first and second samples used to form the sum array; and an inverse mapping circuit configured to transformationally calculate a first sequence of decoded values using the sum array of N/2 samples of digital audio data and transformationally calculate a second sequence of decoded values using the difference array of N/2 samples of digital audio data; and an output configured to accept a plurality of third sequences of M output values, each of the plurality of third sequences formed by alternately drawing successive samples from the first sequence of decoded values and the second sequence of decoded values and overlapping and adding successive ones of the plurality of third sequences, wherein M is N/2.

19. The low power digital audio decoder of claim 18 wherein the inverse mapping circuit is configured to execute an inverse modified discrete cosine transform when calculating the first and second sequences of decoded values.

* * * * *